(12) United States Patent
Agesen

(10) Patent No.: US 8,380,939 B2
(45) Date of Patent: *Feb. 19, 2013

(54) SYSTEM AND METHOD FOR MAINTAINING MEMORY PAGE SHARING IN A VIRTUAL ENVIRONMENT

(75) Inventor: Ole Agesen, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/214,028

(22) Filed: Aug. 19, 2011

(65) Prior Publication Data

US 2012/0054411 A1   Mar. 1, 2012

Related U.S. Application Data

(63) Continuation of application No. 12/246,402, filed on Oct. 6, 2008, now Pat. No. 8,006,043.

(51) Int. Cl.
*G06F 9/455* (2006.01)
*G06F 7/04* (2006.01)
*G06F 12/08* (2006.01)

(52) U.S. Cl. ............... 711/147; 711/152; 711/E12.102; 717/148

(58) Field of Classification Search .............. 711/6, 147, 711/152, 162, E12.102; 714/6.1, 6.11; 717/127, 717/134, 136, 148
See application file for complete search history.

(56) References Cited

U.S. PATENT DOCUMENTS

| 7,346,762 | B2 | 3/2008 | Misra et al. |
| 7,555,592 | B1 | 6/2009 | Koryakin et al. |
| 2006/0026577 | A1 | 2/2006 | De Dinechin et al. |
| 2009/0187904 | A1 | 7/2009 | Serebrin et al. |
| 2009/0313612 | A1* | 12/2009 | Vick et al. ............ 717/136 |

* cited by examiner

*Primary Examiner* — Hal Schnee

(57) ABSTRACT

In a virtualized system using memory page sharing, a method is provided for maintaining sharing when Guest code attempts to write to the shared memory. In one embodiment, virtualization logic uses a pattern matcher to recognize and intercept page zeroing code in the Guest OS. When the page zeroing code is about to run against a page that is already zeroed, i.e., contains all zeros, and is being shared, the memory writes in the page zeroing code have no effect. The virtualization logic skips over the writes, providing an appearance that the Guest OS page zeroing code has run to completion but without performing any of the writes that would have caused a loss of page sharing. The pattern matcher can be part of a binary translator that inspects code before it executes.

48 Claims, 3 Drawing Sheets

SYSTEM AND METHOD FOR MAINTAINING MEMORY PAGE SHARING IN A VIRTUAL ENVIRONMENT

CLAIM OF PRIORITY

This Application is a Continuation of U.S. patent application Ser. No. 12/246,402, filed on Oct. 6, 2008, now U.S. Pat. No. 8,006,043.

FIELD OF THE INVENTION

This invention relates generally to the field of memory management in computer systems and, more specifically, to sharing memory between contexts in a virtual machine environment.

BACKGROUND OF THE INVENTION

The instructions for an active application in a computer system are generally loaded into system memory before they are executed. A computer system's performance is generally improved if there is more system memory available for the execution of active applications. Indeed, an application requiring real-time processing of complex calculations such as voice-recognition software, interactive graphics, etc., will not run properly at all unless a certain amount of RAM (Random Access Memory) is reserved for its use.

High-speed system memory is a limited resource and, as with most limited resources, there is often competition for it. This has become an even greater problem in modern multi-tasked systems in which several applications may be running, or at least resident in memory, at the same time. More efficient management of RAM can reduce the cost, energy, or physical space required to support a given workload. Alternatively, more efficient management of RAM can allow a system to support a larger number of applications with better performance, given a fixed monetary, energy, or physical space budget.

An application may be defined broadly as any body of code that is loaded and that executes substantially as a unit. Applications include, among countless other examples, common consumer programs such as word processors, spreadsheets and games; Internet browsers and e-mail programs; software drivers; web servers; and software implementations of a whole computer, commonly known as a "virtual machine" (VM).

One technique for reducing the amount of system memory required for a given workload, and thereby for effectively "expanding" the amount of available system memory, is a scheme in which different applications share the same memory space. With transparent page sharing, in the context of a computer system on which virtual machines are running, memory is conserved by eliminating redundant copies of memory pages, such as those that contain program code, file system buffer cache, or any other replicated code or data. This is especially advantageous for reducing memory overhead associated with running multiple copies of operating systems, e.g., multiple Guest operating systems running in different virtual machines.

U.S. Pat. No. 6,789,156 to Waldspurger for "Content-Based, Transparent Sharing of Memory Units," (hereafter "Waldspurger '156 patent" or "the '156 patent,") the entire contents of which is hereby incorporated by reference for all purposes, implements content-based identification of units of a data storage space that different contexts, e.g., different virtual machines, may be able to share. In the '156 patent, the demand on the system memory can be reduced by allowing one or more contexts to share a single copy of a page of memory when possible, but creating private copies of the page when necessary. Sharing may take place either intra-context or inter-context, or both. The '156 patent describes various ways to determine when two pages of memory are identical and could be shared between contexts.

The Waldspurger '156 patent leverages the write-protection features of a memory system to mark or identify one or more pages, either individually or as a group, in such a way that any attempt to write to those pages will be detected and, therefore, the writing or changing can be prevented or at least delayed.

The term "context" is used here to refer to any software or hardware component, device or system, that addresses and reads from the hardware memory and that has its own address translation (mapping) state. For a traditional OS, a "context" would typically be a "process," which has an address space and associated page tables that contain information about how to map virtual pages to physical pages, and also page-level protection information, such as "read-only" for copy-on-write (COW) pages.

Sharing of pages can often lead to improved performance, for example, the likelihood of contention for memory is reduced because more memory becomes freed for other uses. As above, sharing may allow the use of less memory, leading to the need for fewer or smaller memory devices which, in turn, reduces design complexity and can result in lower energy use, and may save physical space on circuit boards. Such savings are highly desirable, especially in small, mobile systems.

While there are known systems for identifying opportunities for sharing memory, there are still issues as to being able to share memory for as long as possible, even in situations where it may appear that the sharing of memory between two or more contexts should be terminated.

SUMMARY OF THE INVENTION

Generally, memory page sharing, in a virtualized system, is maintained even when a Guest operating system (OS) or other Guest software attempts to write to shared memory. A virtual machine monitor (VMM) or other software or logic in a virtualized system uses a pattern matcher or some other technique to recognize and intercept page zeroing code in the Guest OS, or other code that writes some other content of interest to a memory page. In one embodiment, when page zeroing code in a Guest OS is about to run against a page that is already zeroed, i.e., contains all zeros, and is being shared, a VMM skips over the page zeroing code and the memory writes therein have no effect. This allows the Guest OS page zeroing code to seemingly run to completion but without performing any of the writes that would otherwise have caused a loss of page sharing. The pattern matcher, in one embodiment, is part of a binary translator that inspects code before it executes. Several other ways to intercept guest code during execution, include, for example, hooking the page fault handler, using instruction breakpoints, marking code as being nonexecutable, or having the Guest OS issue a hypercall to the VMM.

In one embodiment of the present invention in a system comprising virtualization logic and a virtual machine (VM) running Guest code, a method of sharing memory pages in the virtualized system comprises: monitoring the Guest code; and determining whether a portion of the Guest code is to be executed identically or not. If it is determined that the Guest code portion is not to be executed identically, then: executing alternate code in place of the determined Guest code portion; and continuing execution of the Guest code from a point within the Guest code subsequent to a location of the non-identically executed Guest code portion. Determining whether the portion of the Guest code is to be executed identically or not is a function of at least one of: contents of a target memory page; and a sharing state of the target memory page.

In another embodiment of the present invention, a method of maintaining memory page sharing in a system running a virtual machine (VM) and a virtual machine monitor (VMM), comprises: intercepting memory page-zeroing code in a Guest operating system (OS) running in the VM; evaluating a memory page that was a target of the intercepted page-zeroing code; and determining whether or not to identically execute the intercepted memory page-zeroing code as a function of the target memory page evaluation.

In another embodiment of the present invention, a method running in a system comprising virtualization logic and a corresponding virtual machine (VM) running Guest code, comprises: the virtualization logic controlling execution of the Guest code and monitoring the Guest code for a predetermined code pattern; if the virtualization logic detects a predetermined code pattern in a portion of the Guest code, the virtualization logic evaluating a state of at least one memory page; and the virtualization logic determining whether or not to identically execute the Guest code portion as a function of the evaluated state of the at least one memory page.

BRIEF DESCRIPTION OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
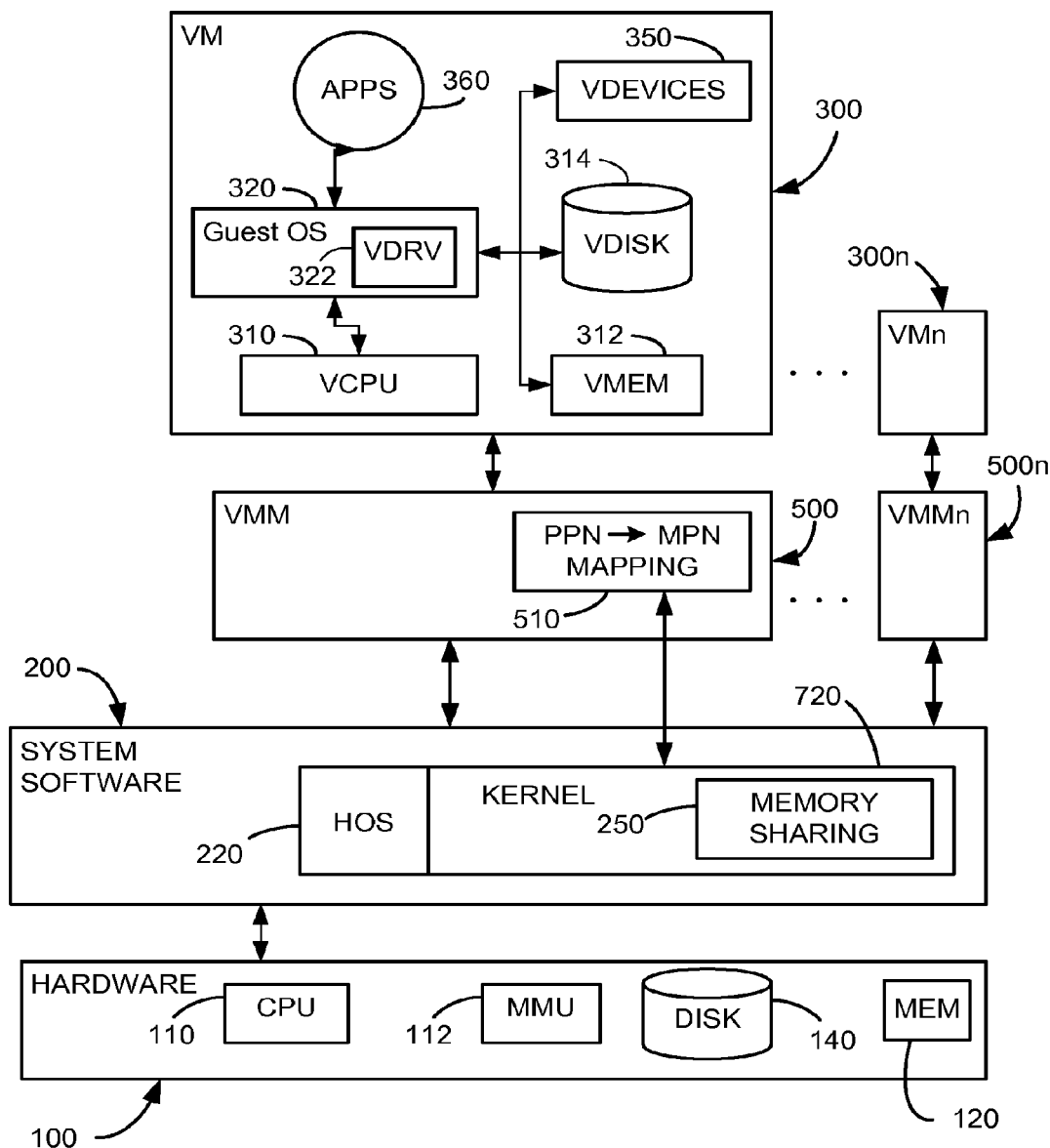
FIG. 1 is a block diagram of a system in which embodiments of the present invention may be implemented.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

As will become clear from the description below, embodiments of the present invention do not require any particular hardware platform. Nonetheless, because it is so common, and by way of example only, it is assumed below that an x86 architecture, e.g., as used in the Intel IA32 line of microprocessors, is being used.

As is well known, system memory is typically divided into individually addressable units, commonly known as "pages," each of which in turn contains many separately addressable data words, which in turn will usually comprise several bytes. Pages are identified by addresses commonly referred to as "page numbers." Embodiments of the present invention do not presuppose any particular page size. Any memory unit may be used and will require little or no modification of the embodiments of the invention described below.

In general, and as background for descriptions of embodiments of the present invention to follow, a system in accordance with the teachings of the '156 patent marks or identifies one or more memory pages that are shared between contexts, either individually or as a group, in such a way that any attempt to write to those pages will be detected and the sharing can be terminated if needed. This is commonly known as "write protection." In some systems, individual pages may be write-protected, for example, using the usual memory management unit (MMU) and page table mechanism.

In a system that implements transparent page sharing in accordance with the teachings of the '156 patent, one most commonly shared memory page often contains all zeros. Embodiments of the present invention prevent a loss of page sharing when a Guest OS zeros memory that was already shared and zeroed.

In one non-limiting example, a Guest OS would be permitted to reboot, during which time it may zero all of its memory, without necessarily causing a significant loss of page sharing. Advantageously, the net result is an improvement in resource utilization because shared memory can remain shared for a longer period of time.

Although zeroed pages are one of the most common shared memory pages, the invention can also be applied to memory pages having any other commonly occurring content, meaning a content that is common to as few as two memory pages. For example, if a virtualized computer system has multiple memory pages, each of which containing all ones (or all 'FF's at a byte level), this invention may be used to maintain or establish a sharing arrangement, in certain circumstances, when a Guest OS is about to write all ones to a memory page, as described below for zeroed pages. As another hypothetical example, a Guest OS may write a numerical representation of the current day of the week into the first location of multiple memory pages, each of such multiple memory pages otherwise containing all zeroes. Thus, there would be multiple memory pages having the identical content, so that a sharing arrangement could be established between any or all of such memory pages. If the virtualization software can detect and intercept the Guest OS when it is about to write the numerical representation of the day of the week to the first location of an otherwise zeroed memory page, then this invention may be used to maintain or establish a sharing arrangement, in certain circumstances, as described below for zeroed pages. Instead of "intercepting" the Guest OS, one can also say that the virtualization software is "interposing upon" the Guest OS, or one could say that the virtualization software is being invoked by the Guest OS. For simplicity, most of this patent is written in terms of zeroed memory pages and zeroing code, but a person of skill in the art will be able to apply the same principles to maintain or establish sharing, in certain circumstances, for memory pages having any common content. The content of the memory pages for which this invention is used to maintain and/or establish a sharing arrangement may be referred to as a "content of interest," a "common content", a "repeated content" or a "duplicated content."

In one embodiment of the present invention, a pattern matcher is implemented to recognize the page zeroing code in a Guest Operating System (or, more generally, the code that writes at least a portion of a memory content of interest). This code is intercepted or interposed upon when it attempts to write to a shared page. As will be described in more detail below with respect to an embodiment of the present invention, because shared pages are write protected, any attempt to write to them will result in a page fault that can be used as a trigger for determining whether the Guest OS is about to execute the page zeroing code. Alternate embodiments will also be described.

As the present invention operates in conjunction with a system implementing page sharing, a general overview of such a page sharing system will first be discussed.

Referring now to FIG. 1, a representation of a virtualized system implementing page sharing in accordance with the '156 patent will be described in order to subsequently describe embodiments of the present invention. System hardware 100 includes a central processor (CPU) 110, which may be a single processor, or two or more cooperating processors in a known multiprocessor arrangement. As in other known systems, the hardware includes, or is connected to, conventional registers, interrupt-handling circuitry, and a memory management unit MMU 112. The MMU 112 is usually integrated on-chip in modern CPUs and uses page table information that is established by the system software. A storage device 140, e.g., a disk drive, and memory 120, for example, RAM, are provided.

As in other computer systems, system software 200 includes a host operating system (HOS) 220, and drivers as needed for controlling and communicating with various devices and the system hardware 100. Embodiments of the present invention do not presuppose any particular host operating system, and because the characteristics and functions of operating systems are so well known, the HOS 220 need not be discussed in greater detail.

At least one virtual machine (VM) 300, . . . , 300n, is installed to run as a Guest on the host system hardware and software. As is well known in the art, a VM is a software abstraction—a "virtualization"—of an actual physical computer system. As such, each VM 300 will typically include one or more virtual CPUs 310 (VCPU), a virtual or Guest Operating System 320 (Guest OS) (which may, but need not, be a copy of a conventional, commodity OS), a virtual system memory 312 (VMEM), a virtual disk 314 (VDISK), virtual peripheral devices 350 (VDEVICES) and drivers 322 (VDRV) for handling the virtual peripheral devices 350, all of which are implemented in software to emulate components of an actual or physical computer. Although the key components of only one VM 300 are illustrated in FIG. 1, the structure of any other VM may be essentially identical.

Most computers are intended to run various applications, and VMs are no exception. Consequently, by way of example, as shown in FIG. 1, a group of applications 360 (which may be a single application) is installed to run at user level on the Guest OS 320; any number of applications, including none at all, may be loaded for running on the Guest OS, limited only by the capacity or requirements of the VM. In some virtualization systems, an application (or a user of the application) will not "know" that it is not running directly on "real" hardware. As known to one of ordinary skill in the art, the applications and the components of the virtual machine 300 are instructions and data stored in memory, just as any other software. The concept, design and operation of virtual machines are well known in the field of computer science.

Virtualization software operates as an interface between a VM and the combination of the underlying "real" OS 220 and the hardware 100. As functionality of the virtualization software may alternatively be implemented in hardware or firmware, a more general term for this functionality is "virtualization logic." The OS 220 is real in the sense of being either the native OS of the underlying physical computer, or the OS (or other system-level software) that handles actual I/O operations, takes faults and interrupts, etc. The hardware 100 and the OS 220, together, are responsible for executing VM-issued instructions and transferring data to and from the actual, physical memory 120 and the storage devices 140.

The virtualization software may take the form of a virtual machine monitor (VMM) 500, which is usually a "thin" piece of software that runs directly on top of a host, or directly on the hardware, and virtualizes all, or at least some subset of, the resources of the machine. A virtual machine monitor may also be referred to as a hypervisor. This patent generally uses the phrase "virtual machine monitor," although the invention may be implemented in connection with virtualization software or virtualization logic that may not be called or considered a virtual machine monitor. Regardless of the terminology used, hypervisors, and other similar virtualization logic, are generally equivalent to a virtual machine monitor, as used herein.

In this embodiment, the interface exported by a VMM 500 to a respective VM 300 is the same as the hardware interface of the machine, or at least of some predefined hardware platform, so that the Guest OS 320 cannot determine the presence of the VMM. The VMM 500 also usually tracks and either forwards to the HOS 220, or itself schedules and handles, all requests by its VM for machine resources as well as handling various faults and interrupts. The general features of VMMs are known in the art and therefore need not be discussed in further detail here.

In FIG. 1, VMMs 500, . . . , 500n, are shown, acting as interfaces for their respective attached VMs 300, . . . , 300n. It would also be possible to include each VMM 500 as part of its respective VM 300, that is, in each virtual system. Moreover, it would also be possible to use a single VMM 500 to act as the interface to all VMs 300, . . . , 300n. The VMM 500 provides a well-defined, known interface between its corresponding virtual system 300 and the underlying system hardware 100 and system software 200.

In some known virtualization systems, VMMs run directly on the underlying system hardware 100, and will thus act as the "real" operating system for its associated VM. In other systems, the HOS 220 is interposed as a software layer between VMMs and the hardware. Still other arrangements are possible, and known to those of ordinary skill in the art. Each VMM will typically include other software components such as device emulators that emulate the characteristics of respective physical devices. Such components, and others such as an interrupt handler, etc., are common in VMMs but are not necessary to understand embodiments of the present invention and are, therefore, not illustrated or described here.

One advantage of virtualization is that each VM can be isolated from all others, and from all software other than the VMM, which itself will be transparent to the VM; indeed, as above, in this embodiment, the user of a VM will be completely unaware that it is not a "real" computer. The VMM controls the mapping from Guest physical addresses to machine addresses (which may also be called host physical addresses). As a result, a change in mapping of Guest physical addresses to machine addresses can be accomplished in a manner that is transparent to the VM, and that does not require modifications to the Guest Operating System.

A kernel 720 may be configured to function as a common interface between all VMMs and the HOS 220. The kernel 720, however, may instead be configured so as to act as, and thus effectively to replace, the HOS itself with respect to scheduling of system resources and interrupt handling. In FIG. 1, the kernel 720 is shown as being a part of system software 200 along with the HOS 220 merely for the sake of illustration; both configurations are possible according to embodiments of the invention. In other patents owned by VMware, Inc., the assignee of this patent, a similar reference has been made to hosted virtualization systems and unhosted or kernel-based virtualization systems.

A memory sharing module 250 is located within the system-level software kernel 720, so that it will be able to set up page sharing not only for different applications within a single VM, but also between different VMs.

In the following description of embodiments of the present invention, merely for the sake of simplicity, only one VM/VMM pair is discussed. The discussion applies equally, however, to all such VM/VMM pairs that may be included in any given implementation.

The applications 360 (and any other virtual component that runs on the Guest OS) typically address virtual memory, just as in a "real" computer. The Guest OS 320 maps virtual page numbers (VPN) to what it "believes" are machine page numbers, referred to as Guest physical page numbers (PPN). An additional mapping from PPN to MPN must, therefore, take place in order to associate a given VPN with the actual machine memory page MPN. The VPN-to-PPN mapping takes place within the VM 300 (usually under full control of the Guest OS). A memory mapping module 510 in the VMM 500 maintains a PPN-to-MPN map, which may be designed as any other memory page map. When a VMM requests possible sharing of a page, it therefore knows and can pass to the sharing module 250 the Guest PPN and the corresponding MPN.

A distinction should be drawn between address mapping terminology used in this patent and address mapping terminology used in some other patents owned by the assignee of this patent. In some other patents owned by the assignee of this patent, virtual page numbers (VPNs) have been referred to as Guest Virtual Page Numbers or "GVPNs," Guest physical page numbers (PPNs) have been referred to as Guest Physical Page Numbers or "GPPNs," and machine page numbers (MPNs) have been referred to as Physical Page Numbers or "PPNs." This patent, however, uses the address mapping terminology that was used in the '156 patent.

The kernel 720 processes a request (a pshare request) to share a page from a VMM by first ensuring that the page is not currently in use by the kernel itself, that is, it is not the active target of network or disk I/O. If the page is actively being used, then the request for sharing simply fails, and can be tried again later. Once the kernel has determined that the page is inactive, then the memory sharing module 250 implements transparent page sharing by redirecting a mapping of Guest physical pages to machine pages. If the VMM uses shadow page tables (which maps from virtual address directly to machine address) to virtualize Guest memory, any shadow page tables that depend on the physical address for which pshare is established must be invalidated or recomputed. In addition, shared pages are marked as read-only and any attempts to write to these shared pages are intercepted.

In other words, if one context were to change the contents of a shared copy of a page, typically by writing to the page, then this would affect other contexts (or other aspects of a single context) sharing that page. In order to avoid any errors this might cause, once a page has been shared, a copy-on-write (COW) technique based on read-only mappings is employed to actually share the page(s), whereupon each redundant copy can be reclaimed. Any subsequent attempt to write to the shared page will then generate a copy-on-write fault, which will in turn transparently result in the creation of a private copy of the page for the writing context.

Embodiments of the present invention, as will be described in detail below, may be implemented in conjunction with the transparent page sharing (pshare) function provided by systems available from VMware, Inc. of Palo Alto, Calif.

In a system that uses transparent page sharing, such as pshare, one of the most commonly shared pages is one that contains all zeros. Advantageously, embodiments of the present invention prevent the loss of page sharing when a Guest OS (or other Guest code) zeroes memory that was already shared and zeroed. As one non-limiting example, a Guest is then permitted to reboot, during which time it may zero all of its memory, without causing a significant loss of page sharing. By avoiding the loss of page sharing, there is an improvement in resource utilization because shared memory can remain shared for longer.

There are a variety of different ways by which to determine that Guest code is about to zero a page of memory, or write some other content of interest to a memory page. For example, one embodiment of the present invention implements a pattern matcher to recognize code in a Guest that writes a content of interest to a memory page. For simplicity, the code that writes a content of interest is generally referred to as zeroing code herein, as explained above. The recognized code is "intercepted" or "interposed upon" when the code attempts to write to a pshared page. There are a number of techniques, as will be described below, to carry out the "interception." As above, such shared pages are write-protected and, therefore, write attempts result in page faults that can be intercepted by the VMM, in addition to other interception techniques, as will be described below, in order to intercept the Guest execution. When the zeroing code has been recognized and intercepted, embodiments of the present invention will inspect the page that the Guest is about to write to and, as will be described below, act accordingly.

Figure 2:
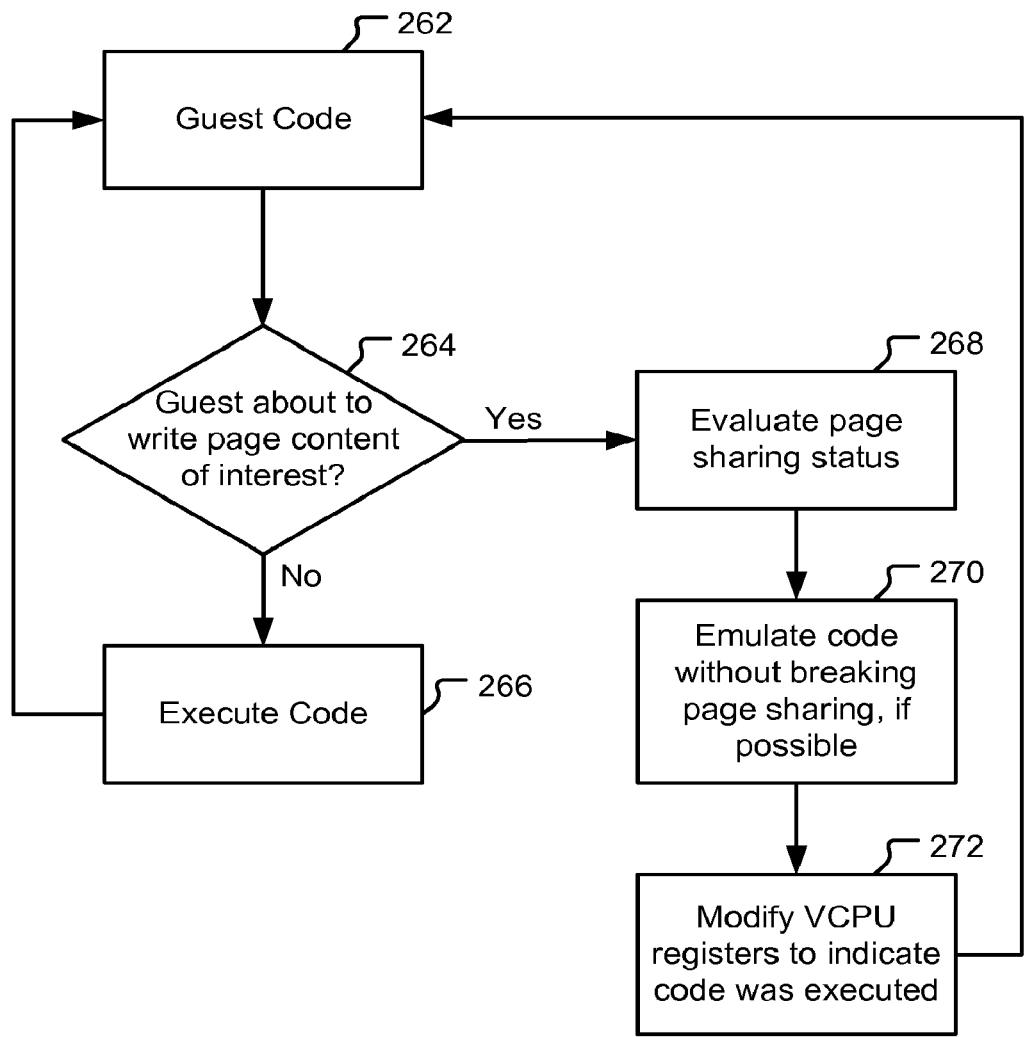
FIG. 2 is a flowchart representing a method in accordance with one embodiment of the present invention.

In general, referring now to FIG. 2, Guest code is executed, step 262, as is known to one of ordinary skill in the art. At step 264, it is determined whether or not Guest code is about to write at least a portion of a "content of interest" to a page of memory. For example, in the pattern matcher embodiment mentioned above, it is determined whether or not the Guest code matches a specific, recognizable pattern, i.e., a pattern of code that triggers an evaluation. If the Guest code is not about to write at least a portion of a content of interest to a page of memory, then control passes to step 266 which executes the Guest code and control returns to step 262 to execute the next instruction of the Guest code. With respect to the common example of zeroed memory pages, the zeroing of memory pages is typically performed by code in the Guest OS. Accordingly, in many embodiments, the method of FIG. 2 may be limited to the execution of Guest OS (i.e., kernel) code, so that it does not extend to the execution of other Guest code.

Returning now to step 264, if it is determined that the Guest code is about to write at least a portion of a content of interest to a page of memory, control passes to step 268 where the status of the page that is being written to is evaluated in order to determine its sharing status, as described in greater detail below. Subsequently, step 270, the Guest code is emulated without breaking page sharing, if possible. If it is not possible to emulate the Guest code without breaking the page sharing, then the instructions are allowed to execute in the "normal" manner that would result if there was no determination that the Guest was about to write a content of interest to a memory page, i.e., any writes to pshared memory would result in the sharing being broken.

At step 272, VCPU state registers are modified to indicate that the Guest code was executed. The VCPU registers store the VCPU state, i.e., the CPU state that the Guest sees and uses to execute the Guest code. As will be described in more detail below, the modification of the VCPU state registers to indicate that the Guest code was executed may occur because the code was executed or, in accordance with embodiments of the present invention, the code was not executed but the VCPU state registers are modified to reflect that the instructions were executed.

In other words, an end result is that the VCPU registers (including special registers like status flags) are set to values that would have resulted had the Guest code actually been executed. Thus, while it is "pretended" to the Guest that the instructions ran to completion, in reality the VMM skipped over their execution, thus avoiding the need to write to pshared memory, i.e., avoiding the need to break sharing, and saving the cycles that would have been consumed by running the Guest OS code for writing the content of interest. Subsequent to step 272, control passes back to step 262 to execute the next sequence of Guest code.

Figure 3:
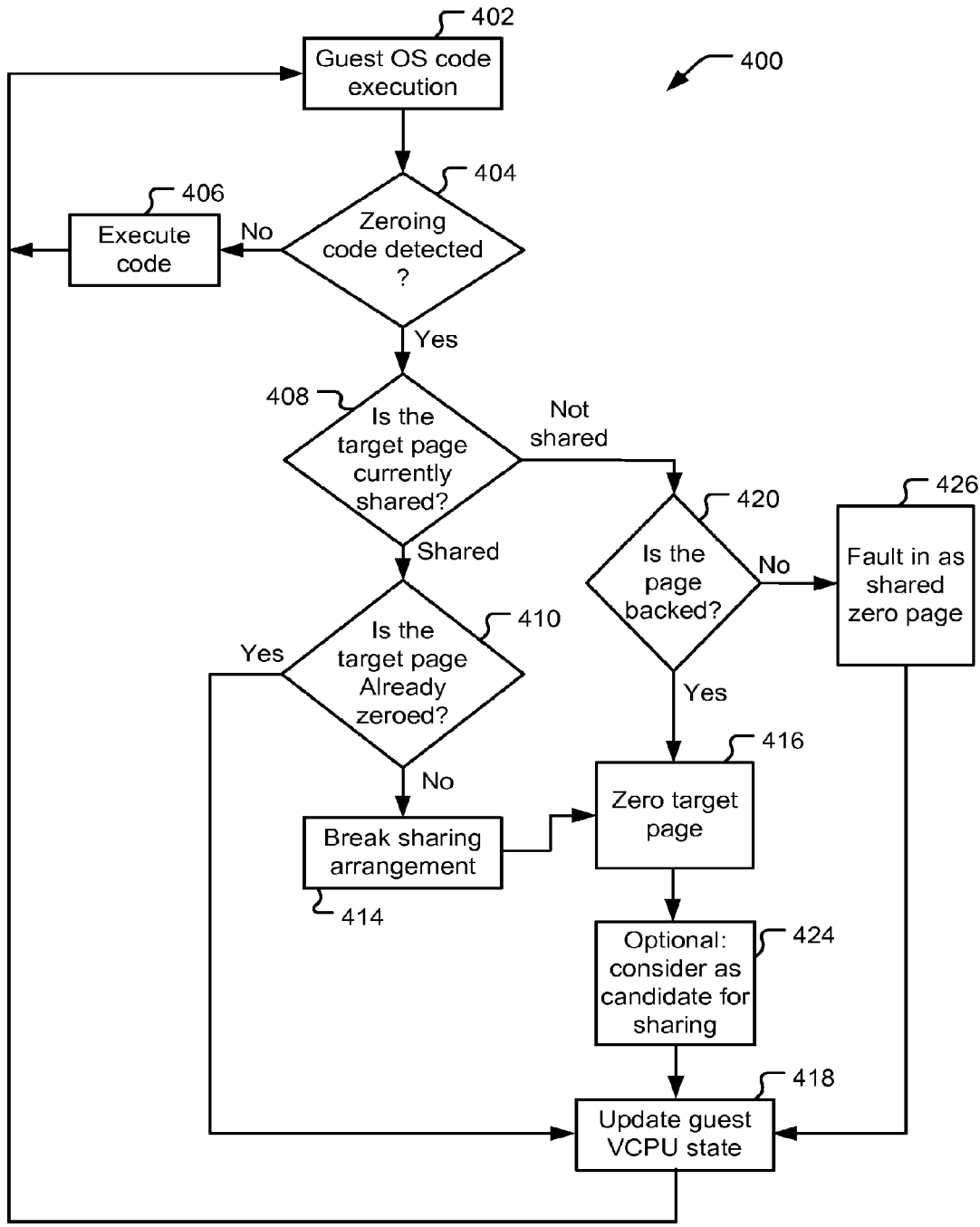
FIG. 3 is a flowchart representing a method in accordance with another embodiment of the present invention.

The flowchart shown in FIG. 2 represents a general overview of a method in accordance with embodiments of the present invention. Referring now to FIG. 3, a method 400 according to one embodiment of the present invention when zeroing code has been recognized and intercepted will now be described.

Initially, step 402, Guest OS code (or other Guest code) is executed. At step 404, it is determined whether or not zeroing code has been detected. Again, there are a variety of ways to determine that zeroing code, i.e., Guest code that zeros a memory page, is about to execute. If zeroing code has not been detected, control passes to step 406 where the code is executed and subsequently a next instruction of the OS code is executed at step 402.

Returning now to step 404, if it is determined that zeroing code has been detected, control passes to step 408 where it is determined if the target page is currently shared. If the target page is currently shared, control passes to step 410 where it is determined if the target page is already zeroed. If it is determined at step 410 that the target page is already zeroed, then control passes to step 418 where the VCPU state is advanced past the zeroing code and the VCPU state registers are updated as if the zeroing code has actually been executed. One of ordinary skill in the art will understand how to update these status registers. Subsequently, control passes back to step 402 to execute the next Guest OS code instruction.

Returning now to step 410, if it is determined that the target page is not already zeroed, control passes to step 414 where the sharing arrangement is broken in accordance with the understood concepts of sharing memory pages as has been described above. At step 416 the target memory page is zeroed. Control then passes to step 424 where, optionally, this page may be considered, i.e., identified, as a promising candidate for subsequent sharing. It should be noted that pages considered as candidates for sharing are normally chosen randomly and, therefore, a page that has just been zeroed is a particularly promising candidate for sharing. It may be possible to skip the zeroing of the target page at this point and immediately share the target page with another zeroed page.

Subsequently, the VCPU state is updated accordingly, step 418. Control then passes back to step 402 to execute the next Guest OS instruction.

As an alternative embodiment, not shown in the figure, control can pass from step 414, where the page sharing has been broken, directly to step 402 where the Guest OS code is executed. Effectively, the method 400 arriving at step 414 is a situation known to those of skill in the art when memory pages have been shared between contexts but the sharing must be discontinued because one context now requires different data. Thus, once the sharing arrangement is terminated for this page, step 414, the Guest OS code can be executed without further ado at step 402.

Returning now to step 408, if it is determined that the target page is not shared, then control passes to step 420 where it is determined if the page currently has any backing, i.e., whether or not it is the first time that the Guest is "touching" or accessing it. If the page is backed, control passes to step 416 where the page is zeroed after which control passes to step 424 where, optionally, this page may be considered as a promising candidate for subsequent sharing. The VCPU registers are updated at step 418 and control returns to step 402 to execute the next Guest OS instruction.

Returning now to step 420, if the page is not backed, control passes to step 426 where the targeted page may be faulted in as a shared zero page. Advantageously, this operation permits Guests that zero memory during boot to be able to boot in a very small footprint. Subsequently, control passes to step 418 where the Guest state is updated to reflect completion of the identified code after which control passes back to step 402 for execution of Guest OS code.

In one embodiment of the present invention, the foregoing method 400 is implemented within the VMM 500 as it can be considered that the VMM has more information regarding the state of a memory page as compared to that of a Guest OS. This is clearly the situation after a reboot where most of the Guest state has been reset. Advantageously, the interception of the page zeroing code by the VMM gives the VMM an opportunity to leverage the "extra knowledge" that it has about the state of a Guest memory page in order to efficiently handle the zeroing code as well as maintain page sharing which might, otherwise, be undone.

In one embodiment of the present invention, the pattern matching operation runs in the VMM which has access to the Guest OS code, as is understood by one of ordinary skill in the art. The match may be to a small piece of code, e.g., a set of instructions or a "pattern" of code that is recognizable. This recognizable pattern may be predetermined and identified as code that results in a page of, for example, all zeros, all ones, or some sequence such as alternating ones and zeros.

There are two well-known techniques for running the virtual instruction stream within a Virtual Machine. One is a software technique referred to as Binary translation (BT). The other technique is hardware virtualization (HV), as provided by Intel Corporation's VT Architecture or AMD's SVM Architecture.

Binary translation and hardware virtualization are generally described in the article "A Comparison of Software and Hardware Techniques for x86 Virtualization" by Adams and Agesen, ASPLOS 2006, Oct. 21-25, 2006, San Jose, Calif., (hereafter "the Adams paper"), the entire contents of which is hereby incorporated by reference herein for all purposes.

Generally, with hardware virtualization, an execution mode, referred to as "Guest Mode," supports direct execution of Guest code, including privileged code, in the hardware. An instruction, "vmrun," transfers execution from host mode to Guest mode.

An in-memory data structure, referred to as a Virtual Machine Control Block (VMCB) combines control state with a subset of the state of a Guest virtual CPU (VCPU). Upon execution of vmrun, the hardware loads the Guest state from the VMCB and continues execution in Guest mode. Guest execution proceeds until some condition, expressed by the VMM using control bits of the VMCB, is reached. At this point, the hardware performs an exit operation, an inverse of the vmrun operation. On exiting, the hardware saves the Guest state to the VMCB, loads the VMM-supplied state into the hardware, and resumes in host mode, now executing the VMM. The VMM handles the exit and after emulating the effect of the exiting operation in the VMCB, the VMM again executes vmrun, returning to Guest mode. The VMM programs the VMCB to cause the Guest mode execution to exit upon the occurrence of various conditions, faults, etc.

A VMM executing the Guest OS code by operation of binary translation has, as its input, binary x86 code, not source code. The translation happens dynamically at runtime, interleaved with execution of the generated code. Binary translation is typically "on demand" in that the code is only translated when it is about to be executed and the translator makes no assumptions about the Guest code. Further, while the input to the translator is the full x86 instruction set, including all privileged instructions, the output is a safe subset, i.e., mostly user-mode instructions.

The foregoing is a very general description of binary translation and hardware virtualization although the general operations are understood by one of ordinary skill in the art.

As described above, embodiments of the present invention determine if the Guest OS code matches a pattern of interest. In one example, it is necessary to detect when the Guest is "about to" execute the memory zeroing pattern of code. Due to the two different ways of virtualizing the x86 instruction set (binary translation and hardware virtualization), however, embodiments of the present invention implement different techniques to determine when the Guest is about to run this particular pattern of code. It should be noted, however, that while detection involves two distinct techniques (because of the two virtualization techniques), the actions that follow after the detection step can be the same.

Detecting Zeroing Code Patterns in a Binary Translation System

With binary translation, Guest code must be translated before it can be executed. The translation typically happens once (translate once, execute many) to keep translation overheads down. In some embodiments of the invention, no Guest kernel code gets to execute directly, and so, instead, the code must first be processed by the translator at the time of first execution. As a result, memory zeroing code patterns can be detected at translation time, so long as the patterns are in the Guest kernel code.

Most instructions need no change during translation and are, therefore "identically" executed. For example, an ADD instruction is translated into an ADD instruction, a STORE into a STORE instruction, etc. As everything is translated, if a set of instructions of interest is detected, the set can be replaced with code that does something (slightly) different. For example, a privileged instruction can be replaced with a translation that accomplishes the effect of the original privileged instruction on the virtual machine's state rather than the physical hardware's state. As a more concrete example, the translation can disable virtual interrupts, rather than physical interrupts. For embodiments of the present invention, a set of instructions that looks like one that zeros memory can be replaced with a "callout" to the VMM to run the method 400 shown in FIG. 3.

Thus, binary translation can match patterns ahead of execution time by taking advantage of the fact that instructions are translated before being allowed to execute.

Detecting Zeroing Code Patterns in a Hardware Virtualization System

Code is not "translated" with hardware virtualization. Therefore, there is no opportunity to inspect code ahead of execution. As a consequence, with hardware virtualization, pattern matching is performed at the time of execution.

One concern is how to stop execution that is plowing ahead at full speed to look for patterns. It is extremely counter-productive to system performance to stop execution between any two instructions to look to see if the system has hit upon a pattern of interest in the code.

Here's a hypothetical example, if a system were to do just that. Consider that a typical instruction takes one cycle to execute. If the system was forced to "exit" from hardware virtualization mode between each instruction, there is a performance hit equal to the price of the "exit." There is also the system price of looking for the pattern. If the exit itself takes ~1000 cycles, execution will have slowed down by ~1000×, which is clearly unacceptable.

As a result, instead of inspecting the Guest's instructions continuously, i.e., between any two instructions, embodiments of the present invention take advantage of the fact that pshared memory has been write-protected from the Guest. The Guest can be run at full speed almost all of the time, however, when the Guest attempts to write to memory that it does not have permission to write to, an "exit" is forced and the exit handler looks to see if it has come upon the memory zeroing (memzero) pattern of code. Advantageously, embodiments of the present invention permit Guests to run at full speed between the points where the code may take an exit.

Alternate embodiments can implement optimizations to make the cost of pattern matching more affordable from a system performance perspective. In one embodiment, the test to see if a memzero code pattern has been reached can be done heuristically. In one non-limiting example, the first 4-16 bytes of Guest code may be analyzed whenever the Guest execution exits from hardware virtualization mode with a page fault. If it is likely that this code matches a memzero code pattern or, for example, some initial threshold of match, a more precise check is performed to confirm that the system has arrived at Guest instructions that match the pattern. In this manner, the cost of pattern matching on unrelated exits can be kept very small.

In another embodiment, the first instruction of the page zeroing code, or any other code that has been so identified, can be set as an instruction breakpoint, i.e., a debug trap, which causes execution to return to the VMM in order to determine whether or not page sharing can be maintained and the zeroing code emulated or skipped. Such an instruction breakpoint can be configured to occur either in the implementation of hardware virtualization or through the binary translation mode of operation.

In still another embodiment of the present invention, sometimes referred to as "paravirtualization," the Guest OS code itself may be modified or patched to make a hypercall to the VMM each time the page zeroing code is to be executed. In response to the hypercall, the VMM determines whether or not page sharing is to be maintained, i.e., is appropriate or not, in accordance with the above description.

In yet another embodiment of the present invention, the VMM marks as non-executable the Guest OS code page where the page zeroing code is stored. Any page can be marked non-executable by setting an XD or NX bit in the page tables that map the page. Here, XD, is an abbreviation for "eXecute Disable," the implementation of this functionality from Intel Corporation and NX, is an abbreviation for "No eXecute," AMD Corporation's term for the same or similar functionality.

A memory section designated with the XD/NX attribute is used only for storing data, so that any processor instructions that are located there cannot be executed. This is generally known as executable space protection and has been used to prevent malicious software from taking over computers by inserting the malicious code into another program's data storage area.

In order to identify each Guest OS code page containing the page zeroing code and mark it as non-executable, several techniques can be used. First, a small program (commonly known as "tools") may be inserted into a virtual machine. This program can identify the location of the page zeroing code and pass the information to the VMM, from which point on, the interception and pattern matching will take effect. One disadvantage is that until the tools have started, the VMM will not know the location of the page zeroing code. Fortunately, for Guest operating systems that do not use address space randomization, it is generally the case that the location of the page zeroing code will remain the same from one power-on of the Guest OS to another, so the VMM can, in most cases, assume that the location is the same as it was the last time this VM ran.

Second, one could hardwire knowledge of the location of the page zeroing code into the VMM for each supported Guest OS. The VMM can then determine which Guest OS is installed in a given VM and determine where the page zeroing code is located.

As described in Sections 2.2-2.4 of the Adams paper, a trace is used to keep a "shadow" data structure in sync with a "primary" data structure. For example, the data structures may be page tables where the primary data structure is defined by the Guest and the shadow structure is a VMM-level concept.

Advantageously, embodiments of the present invention provide for efficient recycling of shadow page tables as implemented in the products from VMware, Inc. of Palo Alto, Calif. As is known, the memory that stores primary page tables is write-protected to permit the VMM to keep the shadow in sync with the primary from which it was derived. With embodiments of the present invention, however, when the memory page that is being zeroed was a primary page table, it can be inferred that this primary page table has most likely been recycled by the Guest, and the trace that was in place to maintain coherency of the corresponding shadow page table can be dropped. At the same time, the shadow page table can be recycled.

A few examples of code that has been observed as being used to zero pages will now be described. These are representative of code patterns that might be recognized or intercepted by one or more embodiments of the present invention. It should be noted that these are only examples and there are any number of programs or routines that could be written to zero out a memory page and that the claims appended hereto are not limited to detecting only these code patterns. Anyone of ordinary skill in the art of writing x86 assembler code can write a software loop to accomplish the zeroing function.

Code Pattern 1 is used for certain 32-bit Windows® Guests. It uses the 16 byte wide %xmm0 register to store 16 bytes at a time. It places four of these instructions back to back so that it can zero 64 bytes in each iteration of the loop.

| CODE PATTERN 1: | |
|---|---|
| loop: | MOVNTPS 0x0(%ecx),%xmm0 |
| | MOVNTPS 0x10(%ecx),%xmm0 |
| | MOVNTPS 0x20(%ecx),%xmm0 |
| | MOVNTPS 0x30(%ecx),%xmm0 |
| | ADD    %ecx,$0x40 |
| | DEC    %edx |
| | JNZ    loop |

Code Pattern 2 is used for many 64-bit versions of Windows® Guests. Prior to the loop's execution, the Guest has placed zero in the general purpose register %rax. Then it runs 8 stores of %rax (each covering 8 bytes) into memory at the location pointed to by the register %rcx. Then the address register %rcx is incremented by 128, and another 8 stores of 8 bytes each are put into memory. Thus, each iteration of the loop covers 128 bytes of memory, requiring 32 iterations to zero an entire page.

| CODE PATTERN 2 | |
|---|---|
| loop: | <REXW> MOVNTI (%rcx),%rax |
| | <REXW> MOVNTI 0x8(%rcx),%rax |
| | <REXW> MOVNTI 0x10(%rcx),%rax |
| | <REXW> MOVNTI 0x18(%rcx),%rax |
| | <REXW> MOVNTI 0x20(%rcx),%rax |
| | <REXW> MOVNTI 0x28(%rcx),%rax |
| | <REXW> MOVNTI 0x30(%rcx),%rax |
| | <REXW> MOVNTI 0x38(%rcx),%rax |
| | <REXW> ADD    %rcx,$0x80 |
| | <REXW> MOVNTI 0xc0(%rcx),%rax |
| | <REXW> MOVNTI 0xc8(%rcx),%rax |
| | <REXW> MOVNTI 0xd0(%rcx),%rax |
| | <REXW> MOVNTI 0xd8(%rcx),%rax |
| | <REXW> MOVNTI 0xe0(%rcx),%rax |
| | <REXW> MOVNTI 0xe8(%rcx),%rax |
| | <REXW> MOVNTI 0xf0(%rcx),%rax |
| | <REXW> MOVNTI 0xf8(%rcx),%rax |
| | <REXW> DEC    %rdx |
| | JNZ    loop |

One or more embodiments of the present invention may look for the above instructions as indicative of zeroing code. Once it is determined that such a code pattern is being executed or is about to execute, the memory page that is being zeroed can also be identified. For example, for the 64-bit case of Code Pattern 2, the address being zeroed is obtained from the register %rcx (or from register %ecx for the 32-bit case of Code Pattern 1). Next, the corresponding Guest physical page is found, and the page is analyzed, in accordance with the methods of FIGS. 2 and 3 above.

As described above, embodiments of the present invention may run in a binary translation system or a hardware virtualization system. Each system offers advantages that the other does not have. A binary translation system may be more flexible, however, a hardware virtualization system may be simpler to implement. The choice is up to the system designer.

Referring back to Code Pattern 2, and the method 400 shown in FIG. 3, assume that the memory identified by register %rcx is either already shared, step 408, or not backed, step 420, and Code Pattern 2 begins to execute. Then, in a hardware virtualized system, a page fault will be generated when the Guest attempts to run the first write in the pattern. For example:

loop: <REXW>MOVNTI (%rcx),%rax will generate an exit because it is attempting a write to memory that the Guest has no permission to write to (either already pshared or no backing whatsoever). The method of FIG. 3 then proceeds as above to determine if this is zeroing code and if sharing can be continued.

The invention has been described in terms of zeroing an entire memory page. However, the invention may also be applied, in part, to zeroing code that only zeroes a subset of a memory page. If a memory page that contains all zeroes is being shared, and a Guest OS attempts to write zeroes to only a subset of the zeroed memory page, there is no need to break the sharing arrangement. Thus, referring back to FIG. 3, suppose that, at step 404, a zeroing code portion is detected that zeroes only a portion of a memory page. If the target memory page is shared, step 408, and the target page is already zeroed, step 410, then there is no need to break the sharing arrangement, step 414, and the method of FIG. 3 can proceed to step 418. However, if the target page is not shared, step 408, or the target page is not already zeroed, step 410, then it generally would not be appropriate to fault in the target page as a shared zero page at step 426, it generally would not be appropriate to zero the entire target page at step 416, and the target page generally is not a particularly good candidate for sharing, step 424. These situations can be handled in a conventional manner, just as they are in existing virtualization products.

The foregoing embodiments of the present invention may be implemented on one or more of the products available from VMware, Inc. of Palo Alto, Calfi.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable medium, e.g. diskette, CD-ROM, ROM, or fixed disk, or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. In a system comprising virtualization logic and a virtual machine (VM) running Guest code, a method comprising:
   the virtualization logic controlling execution of the Guest code and monitoring the Guest code for a predetermined code pattern;
   in response to the virtualization logic detecting the predetermined code pattern in a portion of Guest code, the virtualization logic evaluating a state of at least one memory page; and
   the virtualization logic determining whether or not to identically execute the portion of Guest code as a function of the evaluated state of the at least one memory page.

2. The method of claim 1, wherein monitoring the Guest code for a predetermined code pattern comprises:
   the virtualization logic comparing the Guest code to one or more predetermined code patterns.

3. The method of claim 1, wherein monitoring the Guest code for a predetermined code pattern comprises:
   the virtualization logic receiving a page fault representing an attempt by the Guest code to write to a protected memory page.

4. The method of claim 3, wherein the page fault is generated by a CPU running in a hardware virtualization mode.

5. The method of claim 1, wherein the virtualization logic controlling execution of the Guest code comprises translating Guest code into translated code prior to execution in the VM, and wherein the step of monitoring the Guest code for a predetermined code pattern is performed during the translation.

6. The method of claim 5, wherein translating Guest code into translated code comprises a binary translation.

7. A method of maintaining memory page sharing in a system running a virtual machine (VM) and having virtualization logic, the method comprising:
   intercepting a portion of Guest code running in the VM that writes at least a portion of a content of interest to a target memory page;
   determining whether the target memory page is being shared; and
   determining contents of the target memory page,
   wherein if it is determined that the target memory page is being shared, and it is determined that the content of the target memory page does not match the content of interest, the method further comprising:
   discontinuing sharing of the target memory page.

8. A method of maintaining memory page sharing in a system running a virtual machine (VM) and having virtualization logic, the method comprising:
   intercepting a portion of Guest code running in the VM that writes at least a portion of a content of interest to a target memory page;
   determining whether the target memory page is being shared; and
   determining contents of the target memory page,
   wherein if it is determined that the target memory page is not being shared, and it is determined that the content of the target memory page does not match the content of interest, the method further comprising:
   writing to establish the content of interest in the target memory page; and updating a state of the Guest code in the VM to represent execution of the portion of Guest code.

9. The method of claim 8, wherein updating the state of the Guest code in the VM comprises:
updating corresponding registers and flags in the VM.

10. The method of claim 8, further comprising:
identifying the target memory page as a candidate for subsequent memory page sharing.

11. The method of claim 8, wherein intercepting the portion of Guest code comprises:
the virtualization logic receiving a page fault representing an attempt by the Guest code to write to a protected memory page.

12. The method of claim 11, wherein the page fault is generated by a CPU running in a hardware virtualization mode.

13. The method of claim 11, wherein if the target memory page comprises a primary page table having a corresponding shadow page table, the method further comprising:
removing a trace operation synchronizing the shadow page table with the primary page table; and
freeing memory allocated to the shadow page table.

14. The method of claim 8, further comprising:
the Guest code notifying the virtualization logic that the portion of Guest code is about to execute.

15. The method of claim 8, further comprising:
the virtualization logic defining an instruction break point on an instruction of the portion of Guest code.

16. The method of claim 8, further comprising:
predetermining a memory page location for the portion of Guest code; and
defining the predetermined memory page location as a memory page from which no code is to be executed.

17. The method of claim 8, further comprising:
translating Guest code into translated code prior to execution in the VM; and
intercepting the portion of Guest code comprises comparing the Guest code to one or more predetermined code patterns during the translation.

18. The method of claim 17, wherein translating Guest code into translated code comprises a binary translation.

19. A computer program product comprising a non-transitory computer readable medium having computer readable program code embodied thereon for performing a method in a system comprising virtualization logic and a virtual machine (VM) running Guest code, the method comprising:
the virtualization logic controlling execution of the Guest code and monitoring the Guest code for a predetermined code pattern;
in response to the virtualization logic detecting the predetermined code pattern in a portion of Guest code, the virtualization logic evaluating a state of at least one memory page; and
the virtualization logic determining whether or not to identically execute the portion of Guest code as a function of the evaluated state of the at least one memory page.

20. The computer program product of claim 19, wherein monitoring the Guest code for a predetermined code pattern comprises:
the virtualization logic comparing the Guest code to one or more predetermined code patterns.

21. The computer program product of claim 19, wherein monitoring the Guest code for a predetermined code pattern comprises:
the virtualization logic receiving a page fault representing an attempt by the Guest code to write to a protected memory page.

22. The computer program product of claim 21, wherein the page fault is generated by a CPU running in a hardware virtualization mode.

23. The computer program product of claim 19, wherein the virtualization logic controlling execution of the Guest code comprises translating Guest code into translated code prior to execution in the VM, and wherein the step of monitoring the Guest code for a predetermined code pattern is performed during the translation.

24. The computer program product of claim 23, wherein translating Guest code into translated code comprises a binary translation.

25. A computer program product comprising a non-transitory computer readable medium having computer readable program code embodied thereon for performing a method of maintaining memory page sharing in a system running a virtual machine (VM) and having virtualization logic, the method comprising:
intercepting a portion of Guest code running in the VM that writes at least a portion of a content of interest to one or more memory pages;
determining whether the target memory page is being shared; and
determining contents of the target memory page,
wherein if it is determined that the target memory page is being shared, and it is determined that the content of the target memory page does not match the content of interest, the method further comprising:
discontinuing sharing of the target memory page.

26. A computer program product comprising a non-transitory computer readable medium having computer readable program code embodied thereon for performing a method of maintaining memory page sharing in a system running a virtual machine (VM) and having virtualization logic, the method comprising:
intercepting a portion of Guest code running in the VM that writes at least a portion of a content of interest to one or more memory pages;
determining whether the target memory page is being shared; and
determining contents of the target memory page,
wherein if it is determined that the target memory page is not being shared, and it is determined that the content of the target memory page does not match the content of interest, the method further comprising:
writing to establish the content of interest in the target memory page; and
updating a state of the Guest code in the VM to represent execution of the intercepted portion of Guest code.

27. The computer program product of claim 26, the method further comprising:
identifying the target memory page as a candidate for subsequent memory page sharing.

28. The computer program product of claim 26, wherein intercepting the portion of Guest code comprises:
the virtualization logic receiving a page fault representing an attempt by the Guest code to write to a protected memory page.

29. The computer program product of claim 28, wherein if the target memory page comprises a primary page table having a corresponding shadow page table, the method further comprising:
removing a trace operation synchronizing the shadow page table with the primary page table; and
freeing memory allocated to the shadow page table.

30. The computer program product of claim 26, the method further comprising:

the Guest code notifying the virtualization logic that the intercepted portion of Guest code is about to execute.

31. The computer program product of claim 26, the method further comprising:
   the virtualization logic defining an instruction break point on an instruction of the intercepted portion of Guest code.

32. The computer program product of claim 26, the method further comprising:
   predetermining a memory page location for the intercepted portion of Guest code; and
   defining the predetermined memory page location as a memory page from which no code is to be executed.

33. The computer program product of claim 26, the method further comprising:
   translating Guest code into translated code prior to execution in the VM; and
   intercepting the portion of Guest code comprises comparing the Guest code to one or more predetermined code patterns during the translation.

34. A computer program product comprising a non-transitory computer readable medium having computer readable program code embodied thereon for performing a method of maintaining memory page sharing in a system running a virtual machine (VM) and a virtual machine monitor (VMM), the method comprising:
   intercepting memory page-zeroing code in a Guest operating system (OS) running in the VM;
   evaluating a memory page that is a target memory page of the intercepted memory page-zeroing code; and
   determining whether or not to identically execute the intercepted memory page-zeroing code as a function of the target memory page evaluation.

35. The computer program product of claim 34, wherein evaluating the target memory page comprises:
   determining whether the target memory page is being shared; and
   determining contents of the target memory page.

36. The computer program product of claim 35, wherein if it is determined that the target memory page is being shared, and it is determined that the contents of the target memory page are not all zeros, the method further comprising:
   discontinuing sharing of the target memory page.

37. The computer program product of claim 35, wherein if it is determined that the target memory page is not being shared, and it is determined that the contents of the target memory page are not all zeros, the method further comprising:
   zeroing the contents of the target memory page; and
   updating a state of the Guest OS in the VM to represent execution of the memory page-zeroing code.

38. The computer program product of claim 37, the method further comprising:
   identifying the target memory page as a candidate for subsequent memory page sharing.

39. The computer program product of claim 34, wherein intercepting memory page-zeroing code comprises:
   the VMM receiving a page fault representing an attempt by the Guest OS to write to a protected memory page.

40. The computer program product of claim 39, wherein if the target memory page comprises a primary page table having a corresponding shadow page table, the method further comprising:
   removing a trace operation synchronizing the shadow page table with the primary page table; and
   freeing memory allocated to the shadow page table.

41. The computer program product of claim 34, the method further comprising:
   the Guest OS notifying the VMM that the Guest OS is executing memory page-zeroing code.

42. The computer program product of claim 34, the method further comprising:
   the VMM defining an instruction break point on an instruction of the memory page-zeroing code.

43. The computer program product of claim 34, the method further comprising:
   predetermining a memory page location for the memory page-zeroing code; and
   defining the predetermined memory page location as a memory page from which no code is to be executed.

44. The computer program product of claim 34, the method further comprising:
   translating Guest OS code into translated code prior to execution in the VM; and
   intercepting memory page-zeroing code comprises comparing the Guest OS code to one or more predetermined code patterns during the translation.

45. A method of maintaining memory page sharing in a system running a virtual machine (VM) and having virtualization logic, the method comprising:
   intercepting a portion of Guest code running in the VM that writes at least a portion of a content of interest to a target memory page;
   determining whether the target memory page is being shared; and
   determining contents of the target memory page,
   wherein if it is determined that the target memory page is being shared, and it is determined that the content of the target memory page does match the content of interest, the method further comprising:
      not identically executing the intercepted portion of Guest code; and
      updating a state of the Guest code in the VM to represent execution of the portion of Guest code.

46. A method of maintaining memory page sharing in a system running a virtual machine (VM) and having virtualization logic, the method comprising:
   intercepting a portion of Guest code running in the VM that writes at least a portion of a content of interest to a target memory page;
   determining whether the target memory page is being shared; and
   determining contents of the target memory page,
   wherein if it is determined that the target memory page is not being shared, and it is determined that the content of the target memory page does match the content of interest, the method further comprising:
      mapping the target memory page as a shared memory page that contains the content of interest; and
      updating a state of the Guest code in the VM to represent execution of the portion of Guest code.

47. A computer program product comprising a non-transitory computer readable medium having computer readable program code embodied thereon for performing a method of maintaining memory page sharing in a system running a virtual machine (VM) and having virtualization logic, the method comprising:
   intercepting a portion of Guest code running in the VM that writes at least a portion of a content of interest to a target memory page;
   determining whether the target memory page is being shared; and
   determining contents of the target memory page, wherein if it is determined that the target memory page is being shared, and it is determined that the content of the target memory page does match the content of interest, the method further comprising:

not identically executing the intercepted portion of Guest code; and updating a state of the Guest code in the VM to represent execution of the portion of Guest code.

48. A computer program product comprising a non-transitory computer readable medium having computer readable program code embodied thereon for performing a method of maintaining memory page sharing in a system running a virtual machine (VM) and having virtualization logic, the method comprising:

intercepting a portion of Guest code running in the VM that writes at least a portion of a content of interest to a target memory page;

determining whether the target memory page is being shared; and determining contents of the target memory page, wherein if it is determined that the target memory page is not being shared, and it is determined that the content of the target memory page does match the content of interest, the method further comprising:

mapping the target memory page as a shared memory page that contains the content of interest; and updating a state of the Guest code in the VM to represent execution of the portion of Guest code.

* * * * *